(12) United States Patent
Carrier

(10) Patent No.: US 8,960,394 B2
(45) Date of Patent: Feb. 24, 2015

(54) THRUST ACTIVATED FRICTION ONE-WAY CLUTCH

(71) Applicant: Schaeffler Technologies AG & Co. KG, Herzogenaurach (DE)

(72) Inventor: John Carrier, Westfield, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 163 days.

(21) Appl. No.: 13/796,724

(22) Filed: Mar. 12, 2013

(65) Prior Publication Data

US 2013/0248312 A1   Sep. 26, 2013

Related U.S. Application Data

(60) Provisional application No. 61/614,216, filed on Mar. 22, 2012.

(51) Int. Cl.

| F16H 41/24 | (2006.01) |
|---|---|
| F16D 33/18 | (2006.01) |
| F16F 15/00 | (2006.01) |
| F16H 45/02 | (2006.01) |

(52) U.S. Cl.
CPC .............. *F16D 33/18* (2013.01); *F16F 15/00* (2013.01); *F16H 41/24* (2013.01); *F16H 45/02* (2013.01)
USPC .......................................... 192/3.21; 60/343

(58) Field of Classification Search
CPC .......................... F16H 41/24; F16H 2041/246
USPC ................... 192/3.21, 3.34; 30/341, 343, 345
See application file for complete search history.

(56) References Cited

U.S. PATENT DOCUMENTS

| 3,252,352 A | * | 5/1966 | General et al. ................. 477/61 |
| 3,724,208 A | * | 4/1973 | Welch et al. .................... 60/343 |
| 5,729,976 A | * | 3/1998 | Murata et al. .................. 60/345 |
| 7,353,924 B2 | * | 4/2008 | Hinkel ......................... 192/3.29 |

* cited by examiner

*Primary Examiner* — Richard Lorence
(74) *Attorney, Agent, or Firm* — Simpson & Simpson, PLLC

(57) ABSTRACT

A torque converter, including: a cover; a pump fixedly secured to the cover; an axially displaceable turbine hydraulically coupled to the pump; and an axially displaceable stator at least partially disposed between the pump and the turbine and including a friction clutch with a plurality of clutch plates and respective friction material disposed between the plurality of clutch plates. When the ratio of the rotational speed of the turbine with respect to the rotational speed of the pump is less than a coupling point value, the turbine or the stator is arranged to axially displace to close the friction clutch. When the ratio of the rotational speed of the turbine with respect to the rotational speed of the pump is at least equal to the coupling point value: the stator or the turbine is arranged to axially displace to open the friction clutch; or the stator is arranged to axially displace to close the friction clutch.

19 Claims, 4 Drawing Sheets

THRUST ACTIVATED FRICTION ONE-WAY CLUTCH

CROSS-REFERENCE TO RELATED APPLICATIONS

This application claims the benefit under 35 U.S.C. §119 (e) of U.S. Provisional Patent Application No. 61/614,216 filed Mar. 22, 2012, which application is incorporated herein by reference in its entirety.

TECHNICAL FIELD

The present disclosure relates to a one-way clutch including a friction clutch, in particular, a thrust activated friction one-way clutch for a stator in a torque converter.

BACKGROUND

FIG. 4 is a partial cross-sectional view of prior art torque converter 200. Torque converter 200 includes pump 202, turbine 204, and stator 206. The stator is arranged to engage non-rotatable stator shaft 208. The stator includes one-way clutch (OWC) 210. In torque multiplication mode, when the ratio of the turbine rotational speed to the pump rotational is below a value associated with a coupling point, typically about 0.9, the stator rotates in one direction to rotationally lock the OWC and the stator with the stator shaft. In the locked position, blades 212 divert fluid flow from the pump to the turbine in a desired direction. In a coast or drive mode, when the ratio is at or above the value associated with the coupling point, the stator freely rotates in the opposite direction.

SUMMARY

According to aspects illustrated herein, there is provided a torque converter, including: a cover; a pump fixedly secured to the cover; an axially displaceable turbine hydraulically coupled to the pump; and an axially displaceable stator at least partially disposed between the pump and the turbine and including a friction clutch with a plurality of clutch plates and respective friction material disposed between the plurality of clutch plates. When the ratio of the rotational speed of the turbine with respect to the rotational speed of the pump is less than a coupling point value, the turbine or the stator is arranged to axially displace to close the friction clutch. When the ratio of the rotational speed of the turbine with respect to the rotational speed of the pump is at least equal to the coupling point value: the stator or the turbine is arranged to axially displace to open the friction clutch; or the stator is arranged to axially displace to close the friction clutch.

According to aspects illustrated herein, there is provided a torque converter, including: a cover; a pump fixedly secured to the cover; an axially displaceable turbine hydraulically coupled to the pump; an output hub fixedly connected to the turbine; and an axially displaceable stator at least partially disposed between the pump and the turbine and including a portion, at least partially axially disposed between the output hub and the plurality of clutch plates, and including a plurality of blades. The stator includes a friction clutch with: a first plurality of clutch plates fixedly connected to the portion; a second plurality of clutch plates arranged to connect to a non-rotatable stator shaft; and respective friction material axially disposed between the first and second pluralities of clutch plates. When the ratio of the rotational speed of the turbine with respect to the rotational speed of the pump is less than a coupling point value, the output hub and portion are arranged to axially displace in a first direction to close the clutch and rotationally fix the stator to the stator shaft. When the ratio of the rotational speed of the turbine with respect to the rotational speed of the pump is at least equal to the coupling point value, the output hub and portion are arranged to axially displace in a second direction, opposite the first direction, to open the clutch plate and enable rotation of the stator.

According to aspects illustrated herein, there is provided a torque converter, including: a cover; a pump fixedly secured to the cover; an axially displaceable turbine hydraulically coupled to the pump; an output hub fixedly secured to the turbine; and an axially displaceable stator at least partially disposed between the pump and the turbine and including a portion with a plurality of blades and a friction clutch. The friction clutch includes: a first plurality of clutch plates fixedly connected to the second portion; a second plurality of clutch plates fixedly connected to the stator shaft; and respective friction material axially disposed between the first and second pluralities of clutch plates. The plurality of clutch plates is axially disposed between the output hub and the portion. A threshold value is greater than a coupling point value. When the ratio of the rotational speed of the turbine with respect to the rotational speed of the pump is less than the coupling point value, the output hub is arranged to axially displace in a first direction to close the clutch and rotationally fix the stator to the stator shaft. When the ratio of the rotational speed of the turbine with respect to the rotational speed of the pump is at least equal to the threshold value, the portion is arranged to axially displace in a second direction, opposite the first direction, to close the clutch and rotationally fix the stator to the stator shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
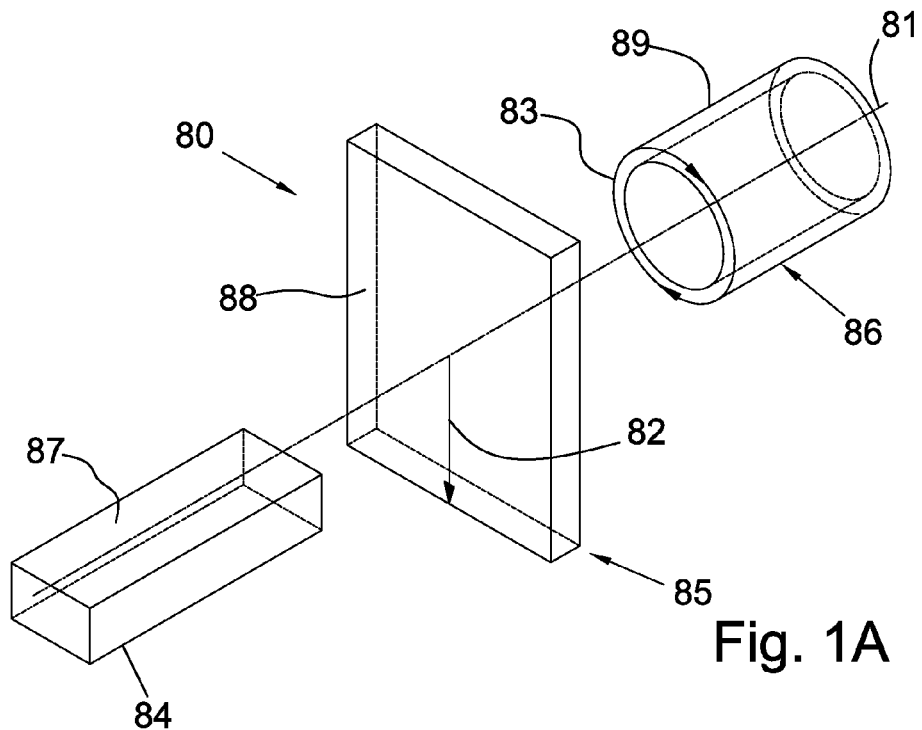
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
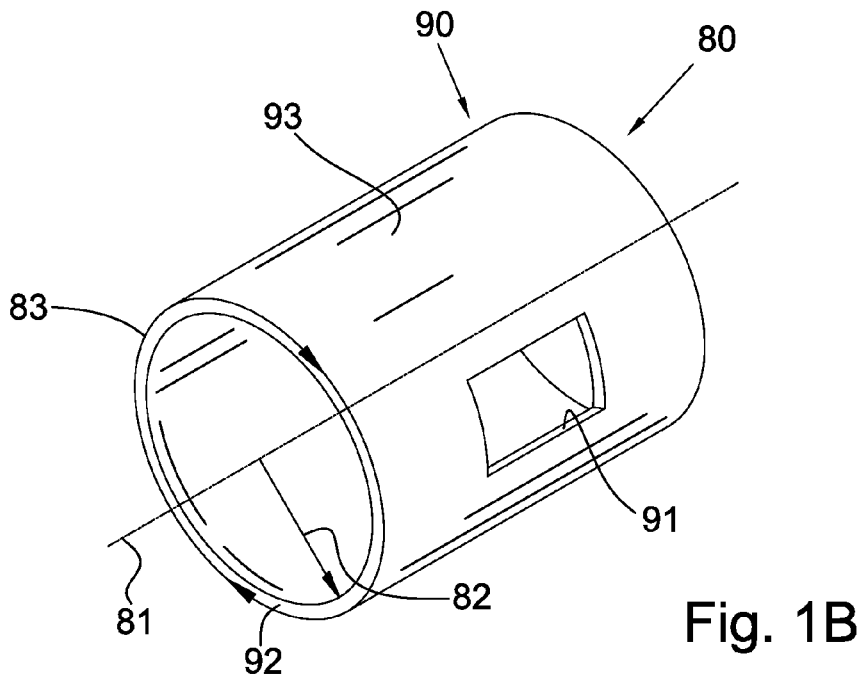
FIG. 1B is a perspective view of an object in the cylindrical coordinate system of FIG. 1A demonstrating spatial terminology used in the present application; and, FIG. 2 is a partial cross-sectional view of a torque converter with a stator with a friction one-way clutch.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
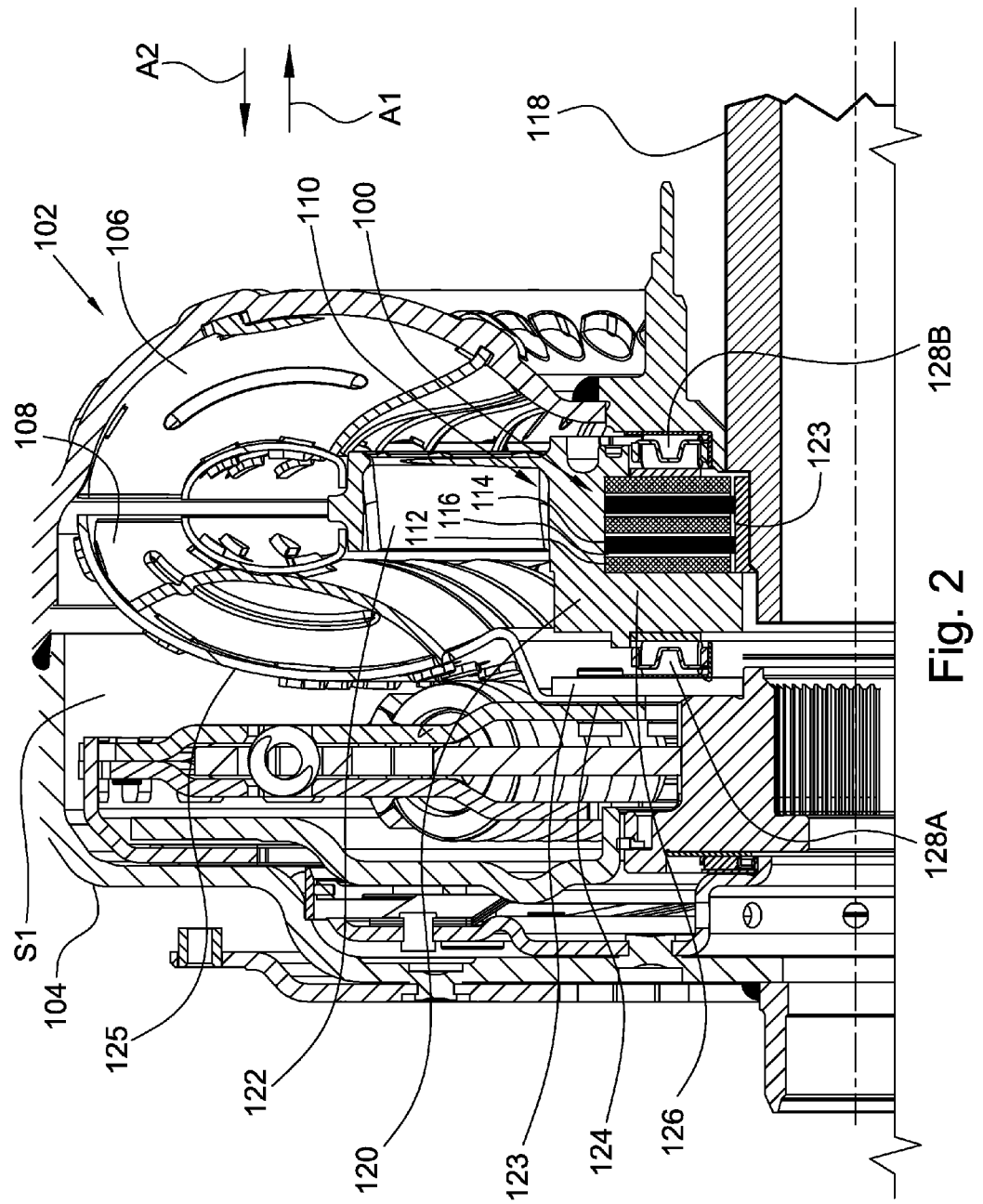

FIG. 2 is a partial cross-sectional view of a torque converter with a stator with friction one-way clutch 100.

Figure 3:
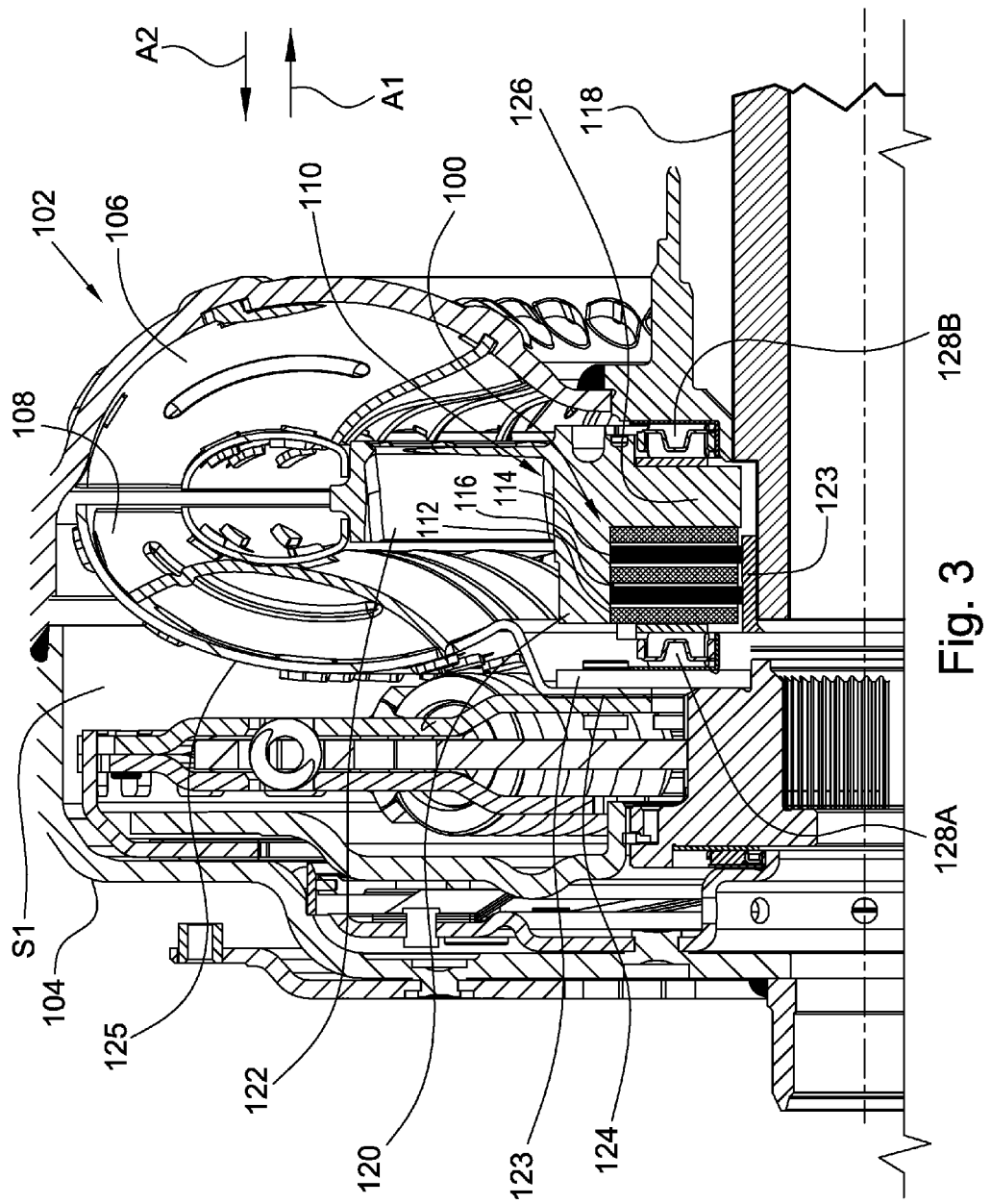
FIG. 3 is a partial cross-sectional view of a torque converter with a stator with a friction one-way clutch; and, FIG. 4 is a partial cross-sectional view of a prior art torque converter.
Figure 4:
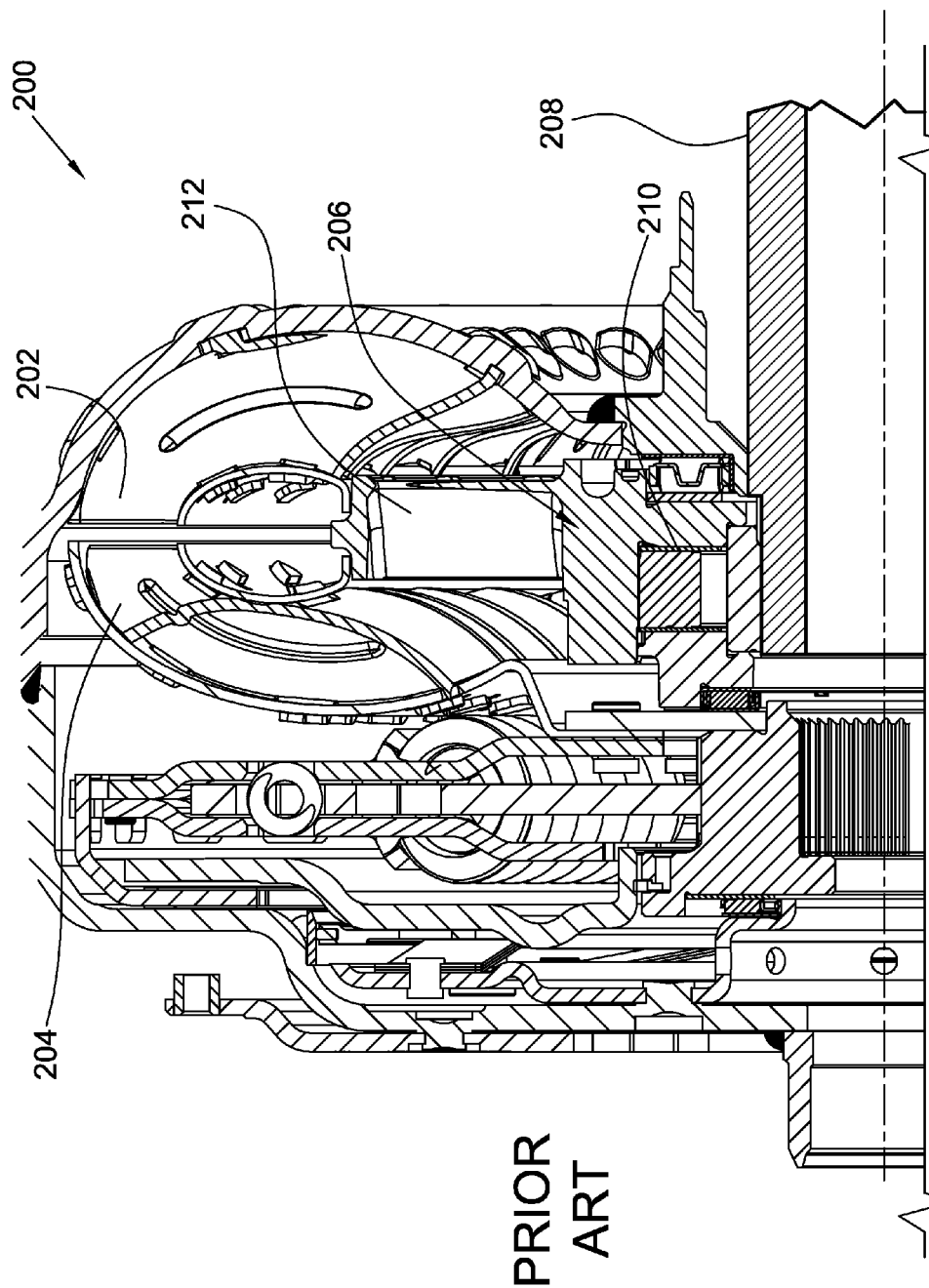

FIG. 3 is a partial cross-sectional view of a torque converter with a stator with friction one-way clutch 100. The following should be viewed in light of FIGS. 2 and 3. Torque converter 102 includes cover 104, pump 106 fixedly secured to the cover, axially displaceable turbine 108 hydraulically coupled to the pump, and axially displaceable stator 110. The stator is at least partially disposed between the pump and the turbine and includes friction clutch 100. Clutch 100 includes clutch plates 112 and 114, and respective friction material 116 disposed between clutch plates 112 and 114. Material 116 can be attached to clutch plates 112 or 114 or can be free of fixed engagement to clutch plates 112 and 114.

Clutch 100 is operable to implement the one-way clutch functions described supra, as well as provide a function not possible with the prior art stator. In torque multiplication mode, for example, at start up for a vehicle in which the torque converter is located, the ratio of the rotational speed of the turbine with respect to the rotational speed of the pump is less than a coupling point value. A typical coupling point value is 0.9. Hydraulic fluid in the pump and in space S1 between the cover and the turbine spins at approximately the rate of rotation of the cover. Hydraulic fluid in the turbine rotates at the rate of the turbine. The combination of rotational speeds for the fluid causes the turbine and the stator to displace in axial direction A1. In torque multiplication mode, the turbine or the stator is arranged to axially displace to close the friction clutch, which rotationally locks the stator.

In the example embodiment of FIG. 2, in coast or drive mode, when the ratio of the rotational speed of the turbine with respect to the rotational speed of the pump is at least equal to the coupling point value, the respective speeds of the respective fluids in the turbine, pump, and S1 are such that the turbine and the stator displace in axial direction A2. The stator and the turbine are arranged to axially displace to open the friction clutch to enable the stator to rotate, or free-wheel.

In the example embodiment of FIG. 3, in coast or drive mode, when the ratio of the rotational speed of the turbine with respect to the rotational speed of the pump is at least equal to the coupling point value and less than a threshold value (the threshold value is greater than the coupling point value) the respective speeds of the respective fluids in the turbine, pump, and S1 are such that the turbine displaces in axial direction A2 to open the clutch. When the ratio is equal to or greater than the threshold value, the respective speeds of the respective fluids in the turbine, pump, and S1 are such that the stator is arranged to axially displace in direction A2 to close the clutch. In this mode, the clutch enables the torque converter to act as a retarder.

The torque converter is arranged to receive non-rotatable stator shaft 118, for example, associated with a transmission input shaft, and the stator includes portion 120 with at least one blade 122. When the friction clutch is closed, portion 120 and blades 122 are rotationally fixed to the stator shaft and divert fluid as described supra. When the friction clutch is open, portion 120 and blades 122 are rotatable.

In an example embodiment, as shown in FIG. 2, in torque multiplication mode, the turbine and the stator are arranged to axially displace to close the friction clutch and rotationally lock the stator. In an example embodiment, as shown in FIG. 3, in torque multiplication mode, the turbine only is arranged to axially displace to close the friction clutch and rotationally lock the stator.

In an example embodiment, as shown in FIG. 2, in coast or drive mode, the stator and the turbine are arranged to axially displace to open the friction clutch and enable rotation of the stator. In an example embodiment, as shown in FIG. 3, in coast or drive mode, the turbine alone is arranged to open to enable rotation of the stator, and the stator alone is arranged to axially displace to close the friction clutch and rotationally lock the stator for a ratio at or above a threshold value.

Plates 112 are rotationally connected to portion 120 and axially displaceable with respect to portion 120. Plates 114 are arranged to connect to the stator shaft such that plates 114 are axially displaceable and rotationally connected to the shaft. Plates 114 may be connected to the shaft by hub 123, for example. By "rotationally connected" we mean the parts are directly or indirectly connected such that rotation of the parts is locked, that is, the parts rotate in unison. Although specific numbers of plates 112 and 114 are shown, it should be understood that the clutch is not listed to a particular number of plates 112 or 114 or a particular ratio of plates 112 to 114. The number and configuration of plates 112 and 114 can be selected according to the thrust load and torque ratios associated with a particular application.

In the example of FIG. 2, the torque converter includes output hub 123 fixedly connected to portion 124 of turbine shell 125. The stator includes portion 126 axially disposed between hub 123/portion 124 and the friction clutch. In torque multiplication mode, the turbine (portion 124) and the stator (portion 126) both axially displace in direction A1 to close the friction clutch and rotationally lock the stator. In coast mode the turbine (portion 124) and the stator (portion 126) both axially displace in direction A2 to open the friction clutch and enable rotation of the stator.

In the example of FIG. 3, in torque multiplication mode, the turbine (portion 124) and the stator (portion 126) both displace in direction A1, but due to the location of portion 126, only portion 124 closes the clutch to rotationally lock the stator. The displacement of portion 126 is blocked in direction A1 as further described below. In coast or drive mode with the ratio below the threshold value, the turbine (portion 124) and the stator (portion 126) both axially displace in direction A2 to open the clutch. When the ratio is at least equal to the threshold value, due to the position of portion 126, portion 126 closes the clutch to rotationally lock the stator. The displacement of portion 124 is blocked in direction A2 as further described below.

In an example embodiment, the torque converter includes bearings 128A and 128B. In an example embodiment, the clutch plates, hub 123/portion 124, and portion 126 are axially aligned with the bearings.

In the example of FIG. 2, portion 126 is axially disposed between bearing 128A and the clutch plates. In torque multiplication mode, thrust from the turbine in direction A1 urges the output hub against bearing 128A, which in turn is urged into contact with portion 126. The thrust of the turbine and the stator closes the friction clutch and is transmitted through the closed clutch to bearing 128B, which forms the reaction surface for the thrust from the turbine and stator. Bearing 128A enables rotation of the hub and the turbine with respect to the rotationally locked stator, and bearing 128B enables rotation of the pump with respect to the rotationally locked stator. In coast mode, the turbine and stator displace in direction A2. Since there is sufficient end clearance at bearing 128A, the turbine and stator displace far enough in direction A2 to open the clutch and relieve reaction forces on the clutch, enabling free wheeling of the stator.

In the example of FIG. 3, portion 126 is axially disposed between the clutch plates and bearing 128B. In torque multiplication mode, thrust from the turbine in direction A1 is transmitted to output hub 123, which in turn is displaced toward bearing 128A. The thrust is transmitted through the bearing to close the clutch. The thrust is transmitted through the closed clutch to portion 126 and the combined thrust of the turbine and stator is reacted against bearing 128B. Bearing 128A enables rotation of the hub and the turbine with respect to the rotationally locked stator. Bearing 128B enables rotation of the pump with respect to the rotationally locked stator In the example of FIG. 3, in coast or drive mode, when the ratio is below the threshold value, the output hub is sufficiently displaced in direction A2 to open the clutch. When the ratio is at least equal to the threshold value, portion 126 displaces in direction A2 to close the clutch. Thrust from the stator in direction A2 is transmitted to the friction clutch to close the clutch. The thrust of the stator is transmitted through the closed clutch to bearing 128A. Bearing 128A forms the reaction surface for the thrust from the stator and enables rotation of the turbine with respect to the rotationally locked stator.

The configuration of torque converter 102 can be selected to enable specific operational parameters. For example, the architecture of the pump, turbine, and stator determine thrust loads, which in turn determine when the friction clutch is closed. As noted above, the thrust loads and torque ratios of a particular configuration can be used to determine the number and configuration of clutch plates in the friction clutch.

Springs, for example, to preload the clutch, can be added to the clutch. Grooves can be added to the friction material to enable flow through the clutch when the clutch is closed, which can help with cooling and reducing drag.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A torque converter, comprising:
   a cover;
   a pump fixedly secured to the cover;
   an axially displaceable turbine hydraulically coupled to the pump;
   an axially displaceable stator at least partially disposed between the pump and the turbine and including a friction clutch with a plurality of clutch plates and respective friction material disposed between the plurality of clutch plates, wherein:
      when the ratio of the rotational speed of the turbine with respect to the rotational speed of the pump is less than a coupling point value, the turbine or the stator is arranged to axially displace to close the friction clutch; and,
      when the ratio of the rotational speed of the turbine with respect to the rotational speed of the pump is at least equal to the coupling point:
         the stator or the turbine is arranged to axially displace to open the friction clutch; or,
         the stator is arranged to axially displace to close the friction clutch.

2. The torque converter of claim 1, wherein:
   when the friction clutch is closed, the stator is rotationally fixed; and,
   when the friction clutch is open, the stator is rotatable.

3. The torque converter of claim 2, wherein:
   the torque converter is arranged to receive a non-rotatable stator shaft;
   the stator includes a portion with a plurality of blades;
   when the friction clutch is closed, the plurality of blades is rotationally fixed to the stator shaft; and,
   when the friction clutch is open, the plurality of blades is rotatable.

4. The torque converter of claim 1, wherein when the ratio of the rotational speed of the turbine with respect to the rotational speed of the pump is less than the coupling point value:
   the turbine and the stator are arranged to axially displace to close the friction clutch and rotationally lock the stator; or,
   the turbine only is arranged to axially displace to close the friction clutch and rotationally lock the stator.

5. The torque converter of claim 1, wherein when the ratio of the rotational speed of the turbine with respect to the rotational speed of the pump is at least equal to the coupling point value:
   the stator and the turbine are arranged to axially displace to open the friction clutch and enable rotation of the stator; or,
   the stator only is arranged to axially displace to close the friction clutch and rotationally lock the stator.

6. The torque converter of claim 1, wherein:
   a threshold value is greater than the coupling point value;
   when the ratio of the rotational speed of the turbine with respect to the rotational speed of the pump is at least equal to the coupling point value and less than the threshold value, the turbine is arranged to axially displace to open the friction clutch and enable rotation of the stator; and, when the ratio of the rotational speed of the turbine with respect to the rotational speed of the pump is at least equal to the threshold value, the stator is arranged to axially displace to close the friction clutch and rotationally lock the stator.

7. The torque converter of claim 1, wherein:
the torque converter is arranged to receive a non-rotatable stator shaft;
the stator includes a portion with a plurality of blades; and,
the plurality of clutch plates includes:
a first group of clutch plates rotationally connected to the portion of the stator; and,
a second group of clutch plates arranged to connect to the stator shaft.

8. The torque converter of claim 1, further comprising an output hub fixedly connected to the turbine, wherein:
the stator includes a portion axially disposed between the output hub and the plurality of clutch plates; and,
when the ratio of the rotational speed of the turbine with respect to the rotational speed of the pump is less than the coupling point value, the output hub and the portion are arranged to axially displace to close the friction clutch and rotationally lock the stator.

9. The torque converter of claim 1, further comprising an output hub fixedly connected to the turbine, wherein:
the stator includes a portion axially disposed between the output hub and the plurality of clutch plates; and,
when the ratio of the rotational speed of the turbine with respect to the rotational speed of the pump is at least equal to the coupling point value, the output hub and the portion are arranged to axially displace to open the friction clutch and enable rotation of the stator.

10. The torque converter of claim 1, further comprising an output hub fixedly connected to the turbine, wherein:
the stator includes a portion axially aligned with the plurality of clutch plates;
the plurality of clutch plates is axially disposed between the output hub and the portion; and,
when the ratio of the rotational speed of the turbine with respect to the rotational speed of the pump is less than the coupling point value, the output hub is arranged to axially displace to close the friction clutch.

11. The torque converter of claim 1, further comprising an output hub fixedly connected to the turbine, wherein:
a threshold value is greater than the coupling point value;
the stator includes a portion axially aligned with the plurality of clutch plates;
the plurality of clutch plates is axially disposed between the output hub and the portion; and,
when the ratio of the rotational speed of the turbine with respect to the rotational speed of the pump is at least equal to the threshold value, the portion is arranged to axially displace to close the friction clutch.

12. The torque converter of claim 1, further comprising first and second bearings, wherein:
the stator includes a portion axially aligned with the first and second bearings and axially disposed between the first bearing and the plurality of clutch plates;
when the friction clutch is closed, the pump and the friction clutch are engaged with the second bearing to enable rotation of the pump with respect to the stator.

13. The torque converter of claim 12, further comprising an output hub fixedly connected to the turbine, wherein:

the output hub is axially aligned with the first and second bearings; and,
when the friction clutch is closed:
the output hub urges the first bearing into engagement with the portion; and,
the first bearing enables rotation of the turbine with respect to the stator.

14. The torque converter of claim 12, wherein when the friction clutch is closed a thrust path is formed from the output hub and portion through the plurality of clutch plates to the second bearing.

15. The torque converter of claim 1, further comprising first and second bearings, wherein:
the stator includes a portion axially aligned with the first and second bearings and axially disposed between the first bearing and the plurality of clutch plates;
when the friction clutch is closed, the friction clutch is engaged with the first bearing to enable rotation of the pump with respect to the stator.

16. The torque converter of claim 15, further comprising an output hub fixedly connected to the turbine, wherein when the friction clutch is closed:
the output hub urges the second bearing into engagement with the plurality of clutch plates; and,
the second bearing enables rotation of the turbine with respect to the stator.

17. The torque converter of claim 16, wherein when the friction clutch is closed:
a first thrust path is formed from the output hub to the first bearing through the friction clutch and portion; or,
a second thrust path is formed from the portion to the second bearing through the friction clutch.

18. A torque converter, comprising:
a cover;
a pump fixedly secured to the cover;
an axially displaceable turbine hydraulically coupled to the pump;
an output hub fixedly connected to the turbine;
an axially displaceable stator at least partially disposed between the pump and the turbine and including:
a portion, at least partially axially disposed between the output hub and the plurality of clutch plates, and including a plurality of blades;
a friction clutch with:
a first plurality of clutch plates fixedly connected to the portion;
a second plurality of clutch plates arranged to connect to a non-rotatable stator shaft; and,
respective friction material axially disposed between the first and second pluralities of clutch plates; and,
wherein:
when the ratio of the rotational speed of the turbine with respect to the rotational speed of the pump is less than a coupling point value, the output hub and portion are arranged to axially displace in a first direction to close the clutch and rotationally fix the stator to the stator shaft; and,
when the ratio of the rotational speed of the turbine with respect to the rotational speed of the pump is at least equal to the coupling point value, the output hub and portion are arranged to axially displace in a second direction, opposite the first direction, to open the clutch plate and enable rotation of the stator.

19. A torque converter, comprising:
a cover;
a pump fixedly secured to the cover;

an axially displaceable turbine hydraulically coupled to the pump;

an output hub fixedly secured to the turbine;

an axially displaceable stator at least partially disposed between the pump and the turbine and including:

a portion with a plurality of blades; and, a friction clutch with:

a first plurality of clutch plates fixedly connected to the second portion;

a second plurality of clutch plates fixedly connected to the stator shaft; and, respective friction material axially disposed between the first and second pluralities of clutch plates, wherein:

a threshold value is greater than a coupling point value;

the plurality of clutch plates is axially disposed between the output hub and the portion;

when the ratio of the rotational speed of the turbine with respect to the rotational speed of the pump is less than a coupling point value, the output hub is arranged to axially displace in a first direction to close the clutch and rotationally fix the stator to the stator shaft; and, when the ratio of the rotational speed of the turbine with respect to the rotational speed of the pump is at least equal to the threshold value, the portion is arranged to axially displace in a second direction, opposite the first direction, to close the clutch and rotationally fix the stator to the stator shaft.

* * * * *